(No Model.) 2 Sheets—Sheet 2.
G. H. ELLIS.
ART OF MANUFACTURING TWINE FROM STRAW.
No. 433,855. Patented Aug. 5, 1890.
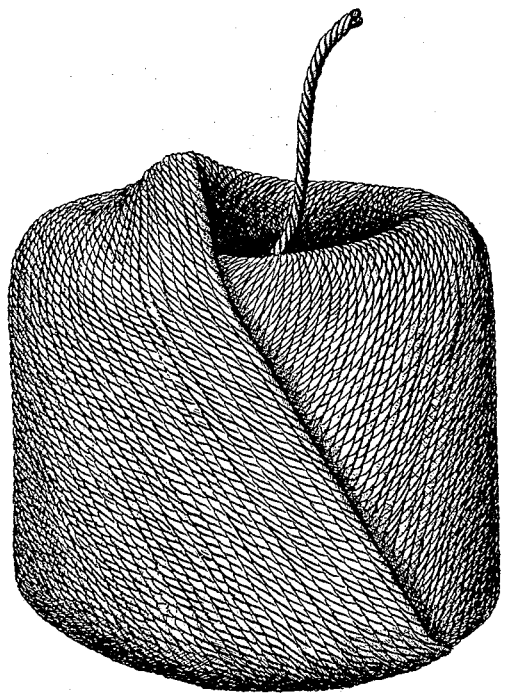
Fig. 4.
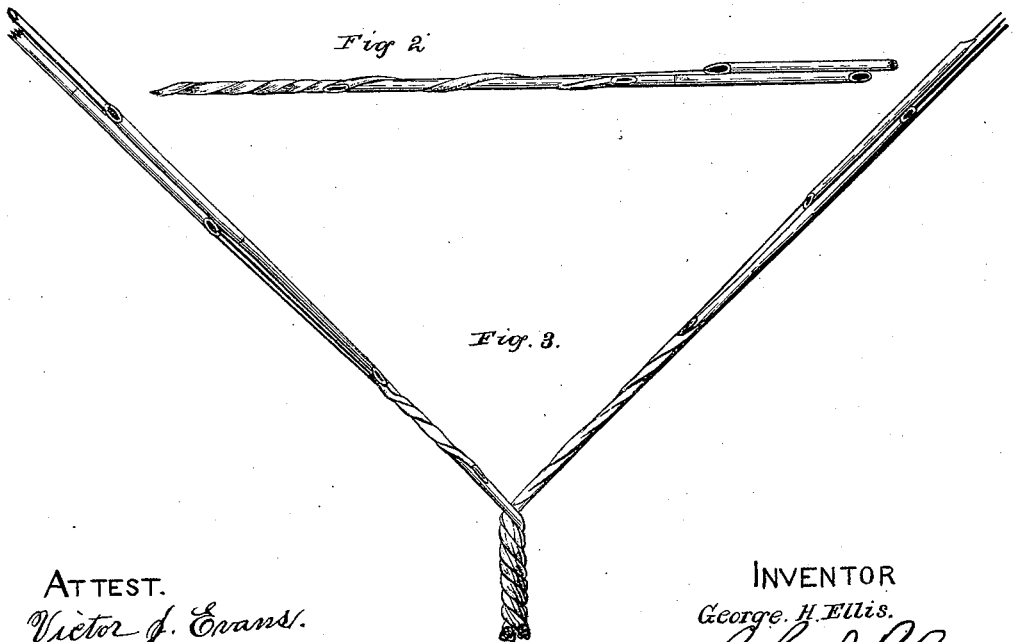
Fig. 2.
Fig. 3.
ATTEST.
Victor J. Evans.
Van Buren Hillyard.
INVENTOR
George. H. Ellis.
By R. S. & A. P. Lacey
Attys.

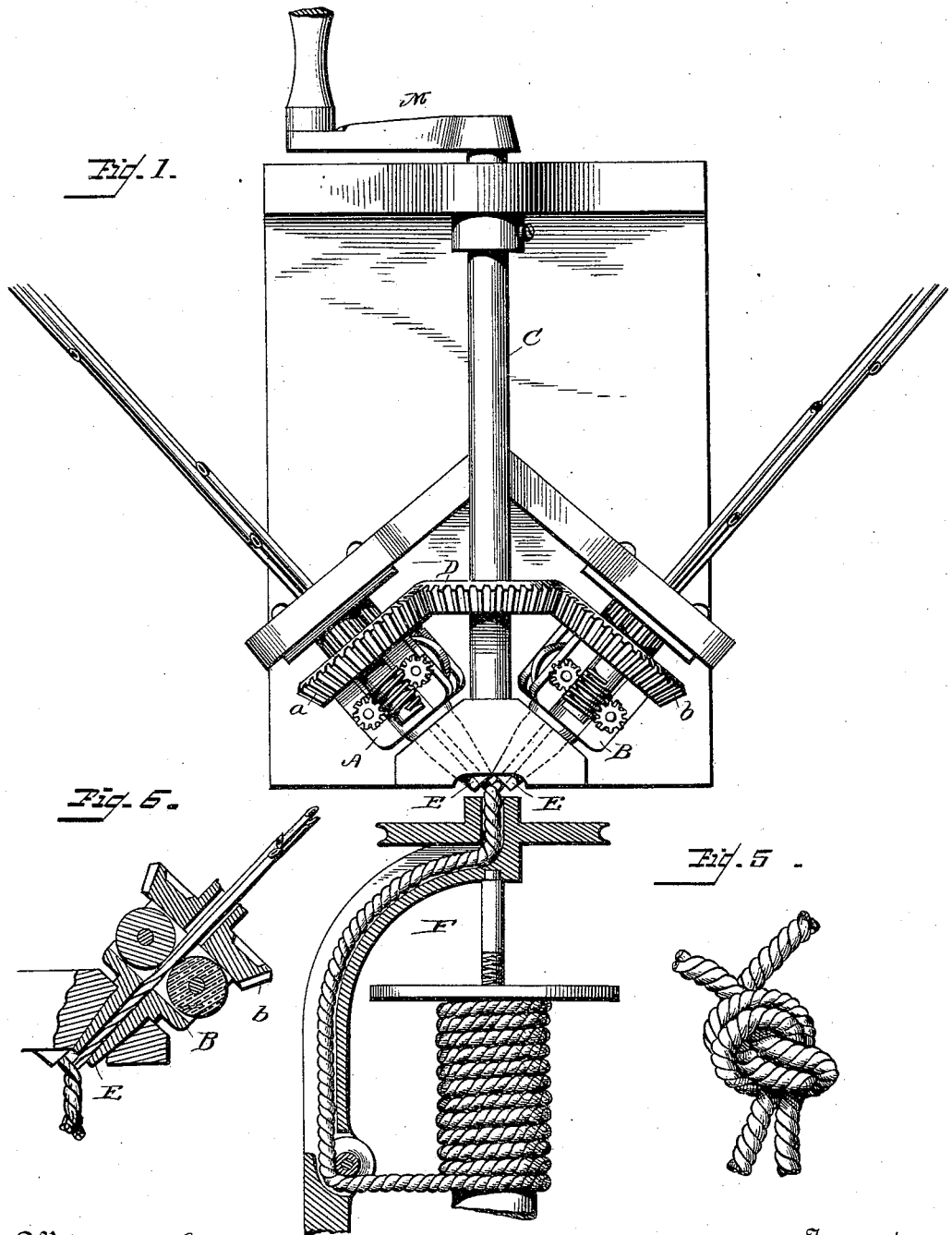

UNITED STATES PATENT OFFICE.

GEORGE H. ELLIS, OF SAUK CENTRE, MINNESOTA, ASSIGNOR OF ONE-HALF TO HENRY KELLER.

ART OF MANUFACTURING TWINE FROM STRAW.

SPECIFICATION forming part of Letters Patent No. 433,855, dated August 5, 1890.

Application filed March 20, 1890. Serial No. 344,652. (Specimens.)

*To all whom it may concern:*

Be it known that I, GEORGE H. ELLIS, a citizen of the United States, residing at Sauk Centre, in the county of Stearns and State of Minnesota, have invented certain new and useful Improvements in the Art of Manufacturing Twine from Straw; and I do hereby declare the following to be a full, clear, and exact description of the invention, such as will enable others skilled in the art to which it appertains to make and use the same.

This invention relates to the art of manufacturing twine made from straw, flax, or hemp stocks or other vegetable materials in their crude state, and aims to produce a twine which will be of uniform texture throughout its entire length, so that it will readily pass through the eye of a binder-needle, and at the same time be strong and sufficiently pliable to be knotted by any ordinary harvester knotter mechanism.

The chief objection to twine heretofore made from straw, &c., is its uneven texture and roughness, the latter being occasioned by the projecting ends of the straw, which wholly unfits it to be passed through the eye of a binder-needle. Twine made from straw, flax-stalks, hemp-stalks, &c., must be so thoroughly manipulated that when completed it presents a perfectly-smooth surface, and of such evenness in size that it will run as easily through the eye of the needle as the well-known twine made from prepared hemp or flax.

To provide a twine made from straw, &c., that can be used on a binder, it is essential that the said twine be pliable to enable it to be knotted readily, strong to enable it to withstand the strain necessary to bind the bundle, and be of a smooth and even texture to pass readily through the eye of the binding-needle. These requirements are filled by the present invention, which will be hereinafter more fully set forth, and which is shown in the accompanying drawings, in which—

Figure 1 is a plan view, parts being broken away, of a machine for carrying the invention into effect. Fig. 2 is a detail view of a single strand. Fig. 3 is a detail view of two strands such as shown in Fig. 2, showing the method of combining them into a two-ply twine. Fig. 4 represents a ball of the twine as it will appear for the market. Fig. 5 shows two ends of the twine knotted. Fig. 6 is a detail section of one of the twisting-heads, showing the manner of holding the twisting portion of the straws which form one strand under compression while being twisted.

The invention, which consists, essentially, in the method of forming a multiple-ply straw twine, is briefly set forth as follows: First, the straws to form the respective strands are twisted together, the twisting portion of each strand being subjected to compression while being twisted, and then the strands to form the twine are twisted together immediately upon relieving them from this compression.

To carry the invention into successful operation I have devised the mechanism shown in Fig. 1 of the drawings, which is exactly the same as that for which on March 24, 1890, I filed an application for patent in the United States, Serial No. 345,172, and in which A and B represent two twisting-heads, which are set at an angle to each other, and which are operated by suitable mechanism—as, for instance, the shaft C, provided with crank M, and the master-wheel D thereon, which meshes with the drive-wheels *a* and *b* of the said twisters. The spinning-tubes or delivery portions E E of the twisters A and B approach very close to each other, so that the strands from each are twisted together as close to the delivery ends of the said tubes as possible and immediately upon the said strands being relieved from compression. The strands are twisted together by any suitable mechanism or provisions, as the rotary twister F, which is a flier of ordinary and well-known construction, and which grasps the strands and twists them together as near the delivery ends of the said tubes E E as possible.

The straws for forming the respective strands are arranged in a progressive series, as indicated in Figs. 1 and 3, and are fed to the twisting-heads A and B, which feed them forward and twist them in the tubes or delivery portions E E, which latter are just large enough to permit the passage of the strands and subject the twisting portion thereof to compression. The rotary twister grasps the strands immediately upon their egress from the delivery portions of the twisters A and B and twists them together to form a multiple-ply twine.

Having thus described my invention, what I claim, and desire to secure by Letters Patent, is—

The herein-described method of making a multiple-ply straw twine, which consists in first twisting together straws to form the respective strands and subjecting the twisting portion of each strand to compression while being twisted, and then twisting together the strands to form the twine immediately upon relieving them from this compression, substantially as described.

In testimony whereof I affix my signature in presence of two witnesses.

GEORGE H. ELLIS.

Witnesses:
C. M. SPRAGUE,
JOS. O. ESTREM.